Patented Aug. 25, 1936

2,052,486

UNITED STATES PATENT OFFICE 2,052,486

PROCESS FOR MAKING SODIUM ALUMINATE

Oscar Adolph Olsen, Little Rock, Ark.

No Drawing. Application February 5, 1934,
Serial No. 709,870

3 Claims. (Cl. 23—52)

This invention relates to a process for making sodium aluminate.

In carrying out my invention aluminum sulphate may be prepared from bauxite, clay or other aluminous material, using sulphuric acid as a solvent, which is a well known process. The solution of aluminum sulphate is then filtered, if necessary, to remove insoluble matter. Sodium hydroxide is then added to the aluminum sulphate solution while constantly stirring the latter. The addition of sodium hydroxide to the aluminum sulphate solution results in the formation of sodium aluminum sulphate and in the precipitation as hydroxides of any iron and titanium which may be present. The solution of sodium aluminum sulphate is separated from any solid matter precipitated.

To the solution of sodium aluminum sulphate, anhydrous alcohol is carefully added, the alcohol gradually becoming diluted. The sodium sulphate is separated from the sodium aluminum sulphate by crystallization or precipitation, thus the sodium sulphate is "thrown out of solution" by the addition of anhydrous alcohol. The sodium aluminate is held in its alcoholic solution. The sodium aluminate alcoholic solution is then filtered, the sodium sulphate being retained on the filter. The sodium sulphate is then washed with alcohol and centrifuged, thus the sodium sulphate produced being a by-product.

The alcohol is then distilled from the sodium aluminate solution and recovered for further use. The resulting sodium aluminate solution may again be treated with anhydrous alcohol to precipitate any sodium sulphate which may have remained in solution, the resulting solution, after separation from any precipitated sulphates in the step just mentioned, may be concentrated, if necessary, to any desired strength.

What is claimed is:

1. A process for making sodium aluminate, comprising adding sodium hydroxide to an aqueous solution of aluminum sulphate, adding substantially anhydrous alcohol, removing sodium sulphate from the alcoholic solution of sodium aluminate, and separating the sodium aluminate by distillation.

2. In a process for making sodium aluminate, the step of removing sodium sulphate from an aqueous solution of aluminum sulphate and sodium hydroxide, consisting of adding thereto substantially anhydrous alcohol to crystallize or precipitate the sodium sulphate, and filtering the sodium sulphate from the alcoholic solution of sodium aluminate.

3. A process for making sodium aluminate, consisting in treating aluminous material with a solution of sulphuric acid, separating insoluble matter from the resulting solution of aluminum sulphate, adding sodium hydroxide, adding substantially anhydrous alcohol, removing sodium sulphate from the alcoholic solution of sodium aluminate, and separating the sodium aluminate by distillation.

OSCAR ADOLPH OLSEN.